United States Patent
Zhang et al.

(10) Patent No.: US 12,220,683 B2
(45) Date of Patent: Feb. 11, 2025

(54) AMINE-FUNCTIONALIZED ADSORBENT AND METHOD FOR PREPARING SAME

(71) Applicant: DeCarbon Technology (Shenzhen) Co., Ltd., Guangdong (CN)

(72) Inventors: Zuotai Zhang, Guangdong (CN); Feng Yan, Guangdong (CN); Xin Sun, Guangdong (CN); Jiyun Xu, Guangdong (CN)

(73) Assignee: DECARBON TECHNOLOGY (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/625,799

(22) Filed: Apr. 3, 2024

(65) Prior Publication Data
US 2024/0408570 A1   Dec. 12, 2024

(30) Foreign Application Priority Data
Jun. 12, 2023 (CN) .......................... 202310695411.6

(51) Int. Cl.
*B01J 20/22* (2006.01)
*B01J 20/28* (2006.01)
*B01J 20/32* (2006.01)

(52) U.S. Cl.
CPC ....... *B01J 20/226* (2013.01); *B01J 20/28066* (2013.01); *B01J 20/28076* (2013.01); *B01J 20/3285* (2013.01)

(58) Field of Classification Search
CPC ............ B01J 20/28066; B01J 20/28076; B01J 20/3285
See application file for complete search history.

(56) References Cited

FOREIGN PATENT DOCUMENTS

| | | | |
|---|---|---|---|
| CN | 101816924 A | 9/2010 | |
| CN | 103990442 A | 8/2014 | |
| CN | 104056598 A | * | 9/2014 |
| CN | 104826610 A | 8/2015 | |
| CN | 107638870 A | 1/2018 | |
| CN | 109647343 A | 4/2019 | |
| CN | 110479213 A | 11/2019 | |
| CN | 113101904 A | 7/2021 | |
| CN | 113976088 A | 1/2022 | |
| CN | 114210301 A | 3/2022 | |
| CN | 114832796 A | 8/2022 | |
| CN | 217313453 U | 8/2022 | |
| EP | 2692413 A1 | 2/2014 | |
| KR | 20180043936 A | 5/2018 | |
| KR | 20190076891 A | 7/2019 | |
| WO | 2017077914 A1 | 5/2017 | |

OTHER PUBLICATIONS

Lin et al., J. Mater. Chem. A. (2014), v.2, p. 14658-14665. (Provided by Applicant).*
"How Frequency Relates to Ultrasonic Cleaning" _UltrosonicPower downloaded_Sep. 5, 2024 (evidence).*
"Ultrasonic processors 500W and 750W" _Sigma-Aldrich Catalog, Downloaded Sep. 5, 2024 (evidence).*
Lin, Yichao et al., "Enhanced Selective CO2 Adsorption on Polyamine/MIL-101(CR) Composites", J. Mater. Chem. A (2014), vol. 2, pp. 14661-14662.
CN First notice of examination opinions dated Oct. 19, 2023 issued in CN 202310695411.6.
CN Notice of the second review opinion dated Dec. 7, 2023 issued in CN 202310695411.6.
CN Notification to grant patent right for invention dated Jan. 29, 2024 issued in CN 202310695411.6.

* cited by examiner

*Primary Examiner* — Yong L Chu
(74) *Attorney, Agent, or Firm* — Scully, Scott, Murphy & Presser, P.C.

(57) ABSTRACT

An amine-functionalized adsorbent and a method for preparing the same are provided. The amine-functionalized adsorbent includes a metal-organic framework (MOF) material and polymeric amine, the crystal structure of the MOF material is a three-dimensional cage-like pore structure, and the polymeric amine is loaded inside the three-dimensional cage-like pore structure. The amine-functionalized adsorbent has high adsorption capacity and rapid adsorbing speed of carbon dioxide at room temperature.

10 Claims, 4 Drawing Sheets

AMINE-FUNCTIONALIZED ADSORBENT AND METHOD FOR PREPARING SAME

CROSS-REFERENCE TO RELATED APPLICATION

The application claims priority to Chinese patent application CN202310695411.6, filed on Jun. 12, 2023, the entire contents of which are incorporated herein by reference for all purposes.

TECHNICAL FIELD

The present invention relates to the field of adsorbents, and particularly to an amine-functionalized adsorbent and a method for preparing the same.

BACKGROUND

Carbon capture is a means to reduce the concentration of carbon dioxide in an atmosphere through direct fixation of carbon dioxide. Solid amine materials have become a material that is often used for carbon capture due to its advantages of large adsorption capacity, low energy consumption and strong interaction with carbon dioxide.

At present, the capture of carbon dioxide using the amine-functionalized adsorbent is generally achieved by heating adsorption. At room temperature, the amine-functionalized adsorbent has low adsorption capacity and slow adsorption speed of carbon dioxide, and therefore it is urgent to further improve.

SUMMARY

In order to achieve the above objective, the present invention discloses an amine-functionalized adsorbent and a method for preparing the same. The amine-functionalized adsorbent has the advantages of high adsorption capacity and rapid adsorbing speed of carbon dioxide without additional heat input.

In a first aspect, the present application provides an amine-functionalized adsorbent.

The amine-functionalized adsorbent includes a metal-organic framework (MOF) material and polymeric amine, the crystal structure of the MOF material is a three-dimensional cage-like pore structure, and the polymeric amines are loaded inside the three-dimensional cage-like pore structure.

As an alternative embodiment, in an embodiment of the first aspect of the present disclosure, the viscosity of the amine-functionalized adsorbent is 100 mPa·s-1000 mPa·s.

As an alternative embodiment, in an embodiment of the first aspect of the present disclosure, the interior of the three-dimensional cage-like pore structure contains an acidic site formed by coordinatively unsaturated metal sites, the pore size is 1.5 nm-3.4 nm, and the polymeric amines bind with the MOF material through the acidic sites.

As an alternative embodiment, in an embodiment of the first aspect of the present disclosure, the specific surface area of the MOF material is 2000 m$^2$/g-3500 m$^2$/g, and the pore volume of the MOF material is 1.0 cm$^3$/g-1.5 cm$^3$/g.

As an alternative embodiment, in an embodiment of the first aspect of the present disclosure, a method for preparing the MOF material includes the following steps: dissolving a soluble metal salt, an organic ligand and a mineralizing agent into a first solvent, reacting for 6 h-48 h at 100° C.-240° C., and filtering after the end of the reaction to obtain the MOF material, a molar ratio of the soluble metal salt to the organic ligand is 1: (0.125-4), and the metal ion in the soluble metal salt is a combination of one or two of $Cr^{3+}$ and $Zn^{2+}$.

As an alternative embodiment, in an embodiment of the first aspect of the present disclosure, the organic ligand is a combination of one or two of terephthalic acid and dimethylimidazole as well as derivatives thereof; and/or, the mineralizing agent is a combination of one or two of hydrofluoric acid and sodium acetate; and/or, the first solvent is a combination of one or more of deionized water, anhydrous methanol, and anhydrous ethanol.

As an alternative embodiment, in an embodiment of the first aspect of the present disclosure, the relative molecular mass of the polymeric amine is 800-5000, and the polymeric amine is a combination of one or two of polyethylene imine (PEI) and polypropylene amine (PPI).

As an alternative embodiment, in an embodiment of the first aspect of the present disclosure, a mass ratio of the MOF material to the polymeric amine is 1:(0.33-15)

In a second aspect, the present disclosure also discloses a method for preparing a amine-functionalized adsorbent. The method for preparing an amine-functionalized adsorbent includes the following steps: adding the MOF material and the polymeric amine into a second solvent, reacting through physical impregnation, and drying to obtain the amine-functionalized adsorbent.

As an alternative embodiment, in an embodiment of the first aspect of the present disclosure, the MOF material and the polymeric amine are mixed under the ultrasonic condition, the ultrasonic time is 10 min-60 min, the ultrasonic frequency is 10 KHz-60 KHz, and the ultrasonic power is 50 W-500 W.

As an alternative embodiment, in an embodiment of the first aspect of the present disclosure, the reaction temperature is 30° C.-90° C., and the reaction time is 2 h-12 h.

As an alternative embodiment, in an embodiment of the first aspect of the present disclosure, the second solvent is a water-soluble component which is a combination of one or more of a deionized aqueous solution, anhydrous methanol, and anhydrous ethanol.

As an alternative embodiment, in an embodiment of the first aspect of the present disclosure, before the MOF material is mixed with the polymeric amine, the MOF material is activated in an oxygen-free environment at 100° C.-150° C., and the oxygen-free environment is achieved by vacuumizing, charging $N_2$ or discharging air with an inert gas.

As an alternative embodiment, in an embodiment of the first aspect of the present disclosure, the drying conditions are as follows: drying for 3 h-4 h at 30° C.-80° C., or ventilating for 1 h-4 h before drying and then drying for 3 h-4 h at 30° C.-80° C.

Compared with the prior art, the present disclosure has the beneficial effects below: The present disclosure provides an amine-functionalized adsorbent. By using the MOF material with the three-dimensional cage-like pore structure as a support of polymeric amine, the three-dimensional cage-like pore structure of this pore size provides a channel for entry of the polymeric amine, thereby loading the polymeric amine onto the interior of the three-dimensional cage-like pore structure of the MOF material so that adjacent amine-functionalized adsorbents are not prone to aggregation. The amine-functionalized adsorbent can rapidly adsorb lots of carbon dioxide, the adsorption capacity of carbon dioxide at a normal temperature is greatly increased and adsorption equilibrium is rapidly reached, the adsorption capacity and adsorption rate of carbon dioxide at the normal temperature are significantly increased, so as to address the problem that at the normal temperature, the adsorption capacity of carbon dioxide is extremely low and the adsorption rate of carbon dioxide is low.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION

Figure 1:
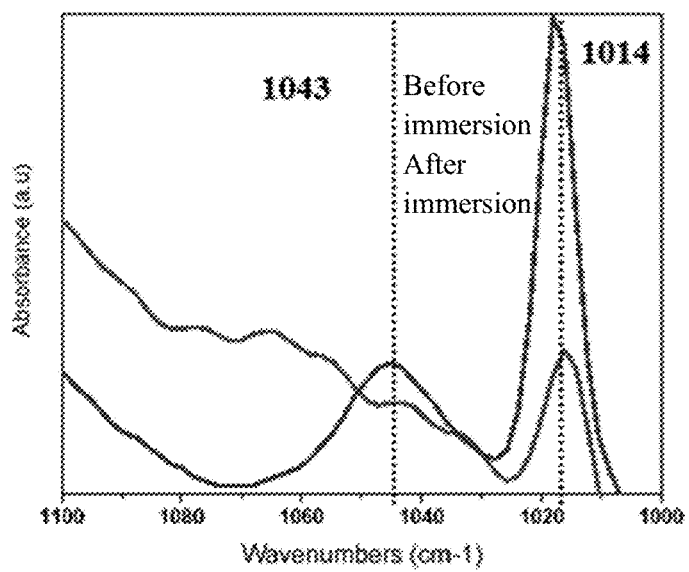
FIG. 1 is a Fourier transform infrared spectroscopy (FT-IR) of MOF material and an amine-functionalized adsorbent disclosed in Example 1 of the present invention.

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

The present disclosure is further described below in detail in combination with the accompanying drawings and embodiments.

Since the viscosity of the polymeric amine is large at a room temperature, a commercially available amine-functionalized adsorbent often loads the polymeric amine onto the surface of a support, which leads to serious aggregation of adjacent amine-functionalized adsorbents. It is difficult for sufficient contact and adsorption between the amine-functionalized adsorbent and carbon dioxide, so the amine-functionalized adsorbent can effectively adsorb carbon dioxide only if the viscosity of the polymeric amine is reduced by heating, but cannot perform effective adsorption at a normal temperature.

In a first aspect, the present application provides an amine-functionalized adsorbent.

The amine-functionalized adsorbent comprises a MOF material and polymeric amine, the crystal structure of the MOF material is a three-dimensional cage-like pore structure, and the polymeric amine is loaded inside the cage-like pore structure.

By using the MOF material with the three-dimensional cage-like pore as a support of polymeric amine, the three-dimensional cage-like pore structure of this pore size provides a channel for entry of the polymeric amine, thereby loading the polymeric amine onto the interior of the three-dimensional cage-like pore structure of the MOF material so that adjacent amine-functionalized adsorbents are not prone to cementation and aggregation. The amine-functionalized adsorbent can rapidly adsorb lots of carbon dioxide, the adsorption capacity of carbon dioxide at a normal temperature is greatly increased and adsorption equilibrium is rapidly reached, the adsorption capacity and adsorption rate of carbon dioxide at the normal temperature are significantly increased, so as to address the problem that at the normal temperature, the adsorption capacity of carbon dioxide is extremely low and the adsorption rate of carbon dioxide is low.

In some embodiments, the viscosity of the amine-functionalized adsorbent is 100 mPa·s-1000 mPa·s.

Since the polymeric amine with the large viscosity at the normal temperature is loaded inside the three-dimensional cage-like pore structure, adjacent amine-functionalized adsorbents are not prone to cementation and aggregation, and therefore the viscosity of the above-mentioned amine-functionalized adsorbent is low, and high dispersibility can be maintained at the normal temperature.

In some embodiments, the interior of the three-dimensional structure contains an acidic site formed by an unsaturated metal center, the pore size of the three-dimensional cage-like pore structure is 1.5 nm-3.4 nm, and the polymeric amine binds with the MOF material through the acidic site.

The pore size of the three-dimensional cage-like pore structure is 1.5 nm-3.4 nm, which is beneficial for the polymeric amine to enter the interior of the three-dimensional cage-like pore structure, the polymeric amine can react and bind with a large number of acidic sites uniformly distributed inside the three-dimensional cage-like pore structure after entering the interior of the three-dimensional cage-like pore structure, so that the polymeric amine is uniformly and stably distributed inside the three-dimensional cage-like pore structure. Thus, the amine-functionalized adsorbent of the present application still can maintain a high adsorption capacity of carbon dioxide after multiple cycles of use.

In some embodiments, the specific surface area of the MOF material is 2000 m²/g-3500 m²/g, and the pore volume of the MOF material is 1.0 cm³/g-1.5 cm³/g.

The above-mentioned MOF material can accommodate lots of polymeric amine, thereby improving the loading capacity of the polymeric amine. Furthermore, the polymeric amine binds with the acidic sites uniformly distributed inside the three-dimensional cage-like pore structure, and therefore lots of polymeric amine can be loaded inside the three-dimensional cage-like pore structure, and meanwhile polymeric amine is not prone to contact and aggregation, so as not to block the pore channel of the three-dimensional cage-like pore structure so that carbon dioxide can better enter the interior of the MOF material, which is advantageous for rapid and large-scale adsorption of carbon dioxide.

In some embodiments, a method for preparing the MOF material comprises the following steps: dissolving a soluble metal salt, an organic ligand and a mineralizing agent into a first solvent, reacting for 6 h-48 h at 100° C.-240° C., and filtering after the end of the reaction to obtain the MOF material, the metal ion in the soluble metal salt is a combination of one or two of $Cr^{3+}$ and $Zn^{2+}$, and a molar ratio of the soluble metal salt to the organic ligand is 1: (0.125-4).

After being dissolved in the first solvent, the soluble metal salt and the organic ligand can form the MOF material through self assembling, and promote the crystal growth of the MOF material through the mineralizing agent, $Cr^{3+}$ and $Zn^{2+}$ are used as metal ions reacting with the organic ligand, and the prepared MOF material has large pore size, pore volume and specific surface area to facilitate the entry of the polymeric amine and carbon dioxide and improve the loading capacity of the polymeric amine and the adsorption capacity of carbon dioxide. The organic ligand is an organic matter capable of coordinating and binding with the above-mentioned metal ions, for example, the organic ligand is a combination of one or two of terephthalic acid and dimethylimidazole as well as derivatives thereof; and/or, the mineralizing agent is a substance promoting the growth of an MOF crystal, such as hydrofluoric acid and sodium acetate; the first solvent functions as dissolving the soluble metal salt and the organic ligand, for example, the first solvent is a combination of one or more of deionized water, anhydrous methanol, and anhydrous ethanol.

In some embodiments, the relative molecular mass of the polymeric amine is 800-5000, and the polymeric amine is a combination of one or two of PEI and polypropylene amine.

After the polymeric amine with the molecular weight of 800-5000 enters the interior of the MOF material, the primary amine of the polymeric amine binds with the uniformly distributed acidic sites of the MOF material in a manner of cross-linking reaction so that the polymeric amine is stably and uniformly loaded onto the inner surface of the MOF material.

Besides, carbon dioxide is completely desorbed when being at a high temperature of 100° C. or more, and the polymeric amine with the molecular weight has good heat resistance and is less likely to transform into a urea compound and become inactive during the desorption of carbon dioxide at the high temperature, which is beneficial for improvement. Thus, the above-mentioned MOF material loaded with the polymeric amine can be recycled many times, maintains a high carbon dioxide adsorption capacity, and has good economic benefits.

In some embodiments, a mass ratio of the MOF material to the polymeric amine is 1: (0.33-15).

The loading capacity of the above-mentioned MOF material with the great pore volume and specific surface area on the polymeric amine is relatively high, thus the polymeric amine uniformly dispersed inside the cage-like pore structure of the MOF material can adsorb more carbon dioxide to promote obvious increase in the adsorption capacity of the amine-functionalized adsorbent on carbon dioxide.

In a second aspect, the present application provides a method for preparing an amine-functionalized adsorbent.

The method for preparing the amine-functionalized adsorbent comprises the following steps: adding an MOF material and polymeric amine into a second solvent, reacting through physical impregnation, and drying to obtain the above-mentioned amine-functionalized adsorbent.

The above-mentioned amine-functionalized adsorbent is simple and controllable in preparation process, convenient to operate, and beneficial for industrial production and application on large scale.

In some embodiments, the MOF material and the polymeric amine are mixed under the ultrasonic condition, wherein the ultrasonic time is 10 min-60 min, the ultrasonic frequency is 10 KHz-60 KHz, and the ultrasonic power is 50 W-500 W.

Under the above-mentioned ultrasonic conditions, the MOF material and the polymeric amine reach resonance, and the polymeric amine can enter and uniformly disperse inside the MOF material, which is conducive to the reaction between the acidic site of the MOF material and the polymeric amine molecule, promotes the binding of the polymeric amine and the MOF material through chemical reaction and allows the polymeric amine to stably disperse inside the cage-like pore structure of the MOF material. Due to too small ultrasonic frequency and power, the MOF material and the polymeric amine cannot realize resonance, leading to a poor uniform dispersion effect of the MOF material, which does not facilitate the reaction and binding of the polymeric amine and the acidic site of the MOF material. Too short time also leads to the poor mixing and dispersion effect of the MOF material and the polymeric amine. Too large ultrasonic frequency and power lead to the easily damaged crystal structure of the MOF material. Too long time leads to reduction in the evaporation of the second solvent, which is not beneficial for the MOF material and the polymeric amine to maintain the uniform dispersion state.

In some embodiments, the reaction temperature is 30° C.-90° C., and the reaction time is 2 h-12 h.

Under the above-mentioned reaction temperature and time, the above-mentioned polymeric amine can sufficiently react with the acidic site of the MOF material so as to realize the stable binding of the polymeric amine and the MOF material and uniformly and stably load the polymeric amine inside the cage-like pore structure of the MOF material.

In some embodiments, the second solvent can be a water-soluble component.

The water-soluble component has good affinity to both the polymeric amine and the MOF material, which is beneficial for uniform dispersion of the polymeric amine and the MOF material at the same time. For example, the water-soluble component is a combination of one or more of a deionized aqueous solution, anhydrous methanol, and anhydrous ethanol.

In some embodiments, before the MOF material is mixed with the polymeric amine, the MOF material is activated in an oxygen-free environment at 100° C.-150° C.

The activation treatment is performed under the above-mentioned conditions, which is beneficial for removing bound water in the MOF material to increase the acidic site formed by the degree of unsaturation of metal sites. Moreover, the above-mentioned activation is performed under anaerobic conditions, making it difficult for the polymeric amine to be oxidized during the activation. For example, the oxygen-free environment is realized by vacuumizing, charging $N_2$ or discharging air with an inert gas.

In some embodiments, the drying conditions are as follows: drying for 3 h-4 h at 30° C.-80° C., or ventilating for 1 h-4 h before drying and then drying for 3 h-4 h at 30° C.-80° C.

The drying for 3 h-4 h at 30° C.-80° C. can sufficiently remove the second solvent in the amine-functionalized adsorbent, and reduce the residual second solvent in the amine-functionalized adsorbent. The ventilating for 1 h-4 h before drying is beneficial for sufficiently discharging bad odor brought by the reaction.

Next, the technical solution of the present invention will be further described in combination with embodiments and drawings.

Example 1

The example 1 of the present application provides an amine-functionalized adsorbent. The amine-functionalized adsorbent comprises an MOF material and PEI loaded onto the MOF material. The PEI, with a molecular weight of 1200, is loaded inside a cage-shape structure. A mass ratio of the MOF material to the PEI is 5:9.

Where, a method for preparing the MOF material comprises: 0.1 mol of chromium nitrate and 0.1 mol of terephthalic acid were dissolved into deionized water, 0.0005 mol of hydrofluoric acid was added, the above materials reacted for 8 h at 220° C., and the reaction product was filtered with ordinary filter paper after the end of the reaction for solid-liquid separation. The solid sample obtained by filtration was the MOF material. The crystal structure of the MOF material was a three-dimensional cage-like pore structure with an average pore size of 2.2 nm, a specific surface area of 3400 $m^2/g$, and a pore volume of 1.5 $cm^3/g$.

A method for preparing the amine-functionalized adsorbent, comprising the following steps: 5 g of MOF material and 9 g of PEI were added into 100 mL of deionized water, ultrasonic treatment was performed for 30 min at an ultrasonic frequency of 30 KHz and an ultrasonic power of 250 W to obtain a suspension, the suspension reacted for 3 h at 30° C., and the reaction solution was subsequently evaporated under the stirring of 200 r/min to remove a solvent and dried for 5 h in an oven at 50° C. after ventilating for 1 h to obtain the above-mentioned amine-functionalized adsorbent.

Example 2

The example 2 of the present application provides an amine-functionalized adsorbent. The example 2 differs from example 1 in that in the preparation process of the amine-functionalized adsorbent, the ultrasonic frequency was 10 KHz, the ultrasonic power was 50 W, and the ultrasonic time was 60 min.

Example 3

The example 3 of the present application provides an amine-functionalized adsorbent. The example 3 differs from example 1 in that in the preparation process of the amine-functionalized adsorbent, the ultrasonic frequency was 60 KHz, the ultrasonic power was 500 W, and the ultrasonic time was 10 min.

Example 4

The example 4 of the present application provides an amine-functionalized adsorbent. The example 4 differs from example 1 in that in the preparation process of the amine-functionalized adsorbent, the suspension reacted for 2 h at 90° C.

Example 5

The example 5 of the present application provides an amine-functionalized adsorbent. The example 5 differs from example 1 in that in the preparation process of the amine-functionalized adsorbent, the suspension reacted for 2 h at 10° C.

Example 6

The example 6 of the present application provides an amine-functionalized adsorbent. The example 6 differs from example 1 in that in the preparation process of the amine-functionalized adsorbent, the suspension reacted for 2 h at 150° C.

Example 7

Provided is a method for preparing an amine-functionalized adsorbent, which differs from the example 1 in that the ultrasonic conditions were different: the ultrasonic frequency was 5 KHz, the ultrasonic power was 250 W, and the ultrasonic time was 60 min, so as to obtain a suspension

Example 8

Provided is a method for preparing an amine-functionalized adsorbent, which differs from the example 1 in that the ultrasonic conditions were different: the ultrasonic frequency was 70 KHz, the ultrasonic power was 250 W, and the ultrasonic time was 30 min, so as to obtain a suspension.

Example 9

Provided is a method for preparing an amine-functionalized adsorbent, which differs from the example 1 in that the ultrasonic conditions were different: the ultrasonic frequency was 30 KHz, the ultrasonic power was 40 W, and the ultrasonic time was 60 min, so as to obtain a suspension.

Example 10

Provided is a method for preparing an amine-functionalized adsorbent, which differs from the example 1 in that the ultrasonic conditions were different: the ultrasonic frequency was 30 KHz, the ultrasonic power was 550 W, and the ultrasonic time was 30 min, so as to obtain a suspension.

Comparative Example 1

Provided is a method for preparing an amine-functionalized adsorbent, which differs from the example 1 in that after being mixed, the MOF material and the PEI were stirred for 30 min at 200 r/min without ultrasonic treatment.

Experiment 1

The above-mentioned MOF material and amine-functionalized adsorbent in example 1 were subjected to FTIR test. The test results are seen in FIG. 1.

As can be seen from FIG. 1, compared with the infrared spectrum of the MOF material before impregnation, there are reduced absorption peaks at 1014 and 1043 of the MOF material in the infrared spectrum of the amine-functionalized adsorbent representing the benzene ring like structure, proving that in the amine-functionalized adsorbent, PEI successfully binds to the above-mentioned MOF material.

Experiment 2

Figure 2:
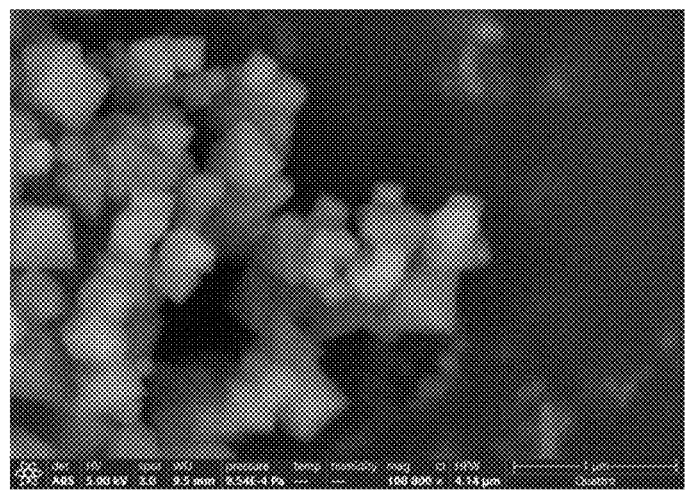
FIG. 2 is a scanning electron microscope (SEM) image of an amine-functionalized adsorbent disclosed in Example 1 of the present invention.
Figure 3:
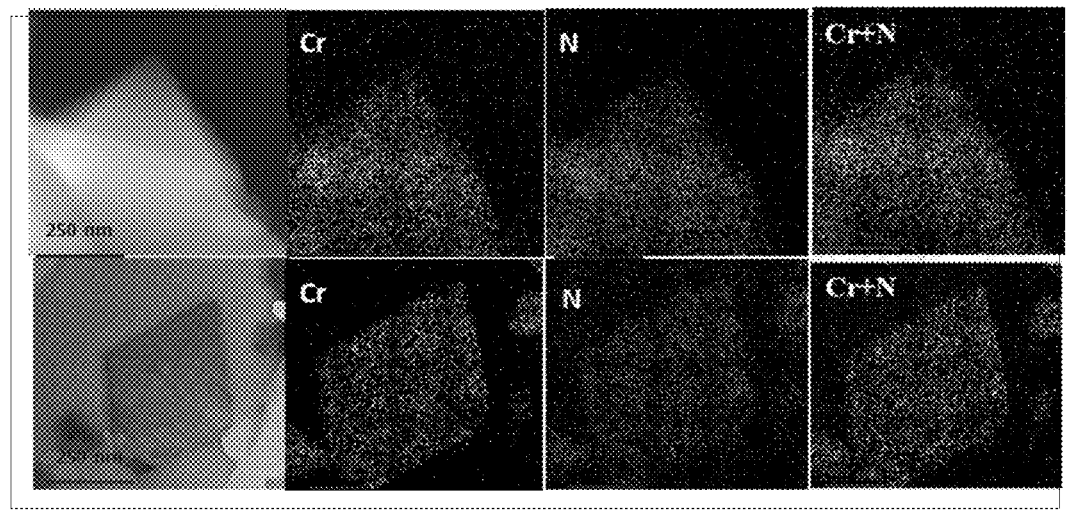
FIG. 3 is a transmission electron microscope (TEM) image of MOF material disclosed in Example 1 of the present invention before and after loading polymeric amine.

SEM was performed on the amine-functionalized adsorbent in example 1, and transmission electron microscopy scanning was performed on the elemental surface of the raw material of the above-mentioned MOF material before and after loading polymeric amine and the elemental surface after slicing. The test results are seen in FIG. 2 and FIG. 3.

As can be seen from the SEM image of the amine-functionalized adsorbent in example 1, the above-mentioned amine-functionalized adsorbent still maintains a certain crystal form, proving that the crystal structure of the above-mentioned MOF material is not damaged.

As can be seen from the TEM image of the elemental surface of the raw material in combination with the elemental surface after slicing, before the above-mentioned MOF material loads PEI, the chromium element representing the above-mentioned MOF material shows fluorescent yellow in the TEM image, and the nitrogen element representing the PEI shows fluorescent green in the TEM image; after the above-mentioned MOF material loads PEI, the chromium element representing the above-mentioned MOF material and the nitrogen element representing PEI simultaneously show fluorescent yellow and fluorescent green in the TEM image, and fluorescent yellow and fluorescent green are mixed and dispersed in the same region, providing that PEI enters the interior of the above-mentioned MOF material, and it can be seen from the TEM scanning of the elemental surface after slicing that PEI is successfully loaded inside the cage-like pore structure of the above-mentioned MOF material.

Experiment 3

BET specific surface area test was performed on the MOF material in example 1, and a pore size distribution curve of the MOF material and a BET adsorption curve of the amine-functionalized adsorbent in example 1 were plotted. The pore size distribution curve of the MOF material is seen in FIG. 4, and the BET adsorption curve of the amine-functionalized adsorbent is seen in FIG. 5.

Figure 4:
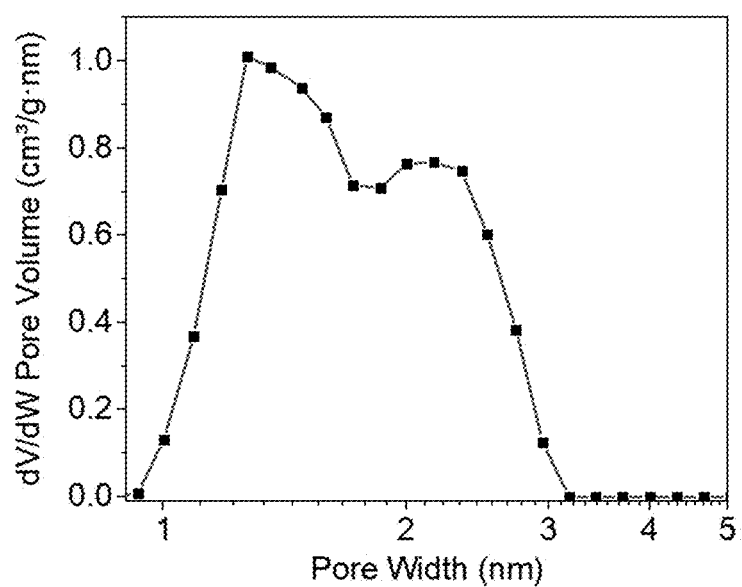
FIG. 4 is a curve graph showing pore size distribution of an MOF material disclosed in Example 1 of the present invention.

As can be seen from FIG. 4, the pore size is in a range of 0-3.4 nm, which is just a size of a three-dimensional cage-like pore structure of one MOF material, indicating that there are small gaps between MOF materials, and PEI easily enters the interior of the cage-like pore structure of the MOF material due to its loading capacity instead of being trapped between the gaps of the MOF materials.

Figure 5:
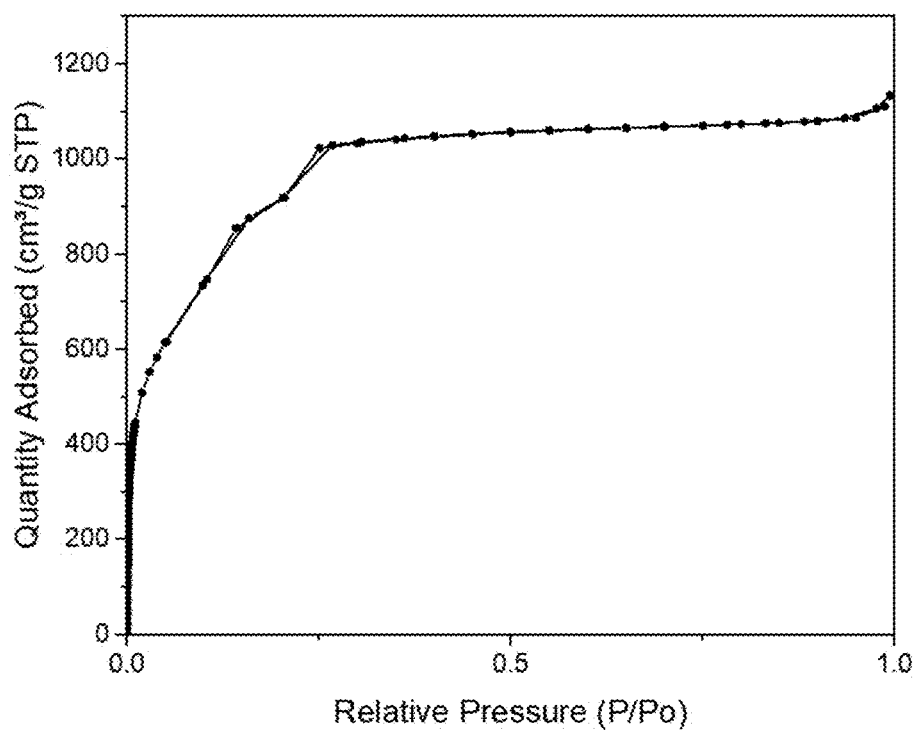
FIG. 5 is a Brunner-Emmet-Teller (BET) adsorption curve graph of an amine-functionalized adsorbent disclosed in Example 1 of the present invention.

As can be seen from FIG. 5, the MOF material in example 1 has a larger specific surface area, which is conducive to uniform dispersion and stable loading of polymeric amine inside the MOF material so that adjacent polymeric amine distributed inside the MOF material is not prone to cementation and aggregation.

Experiment 4

Figure 6:
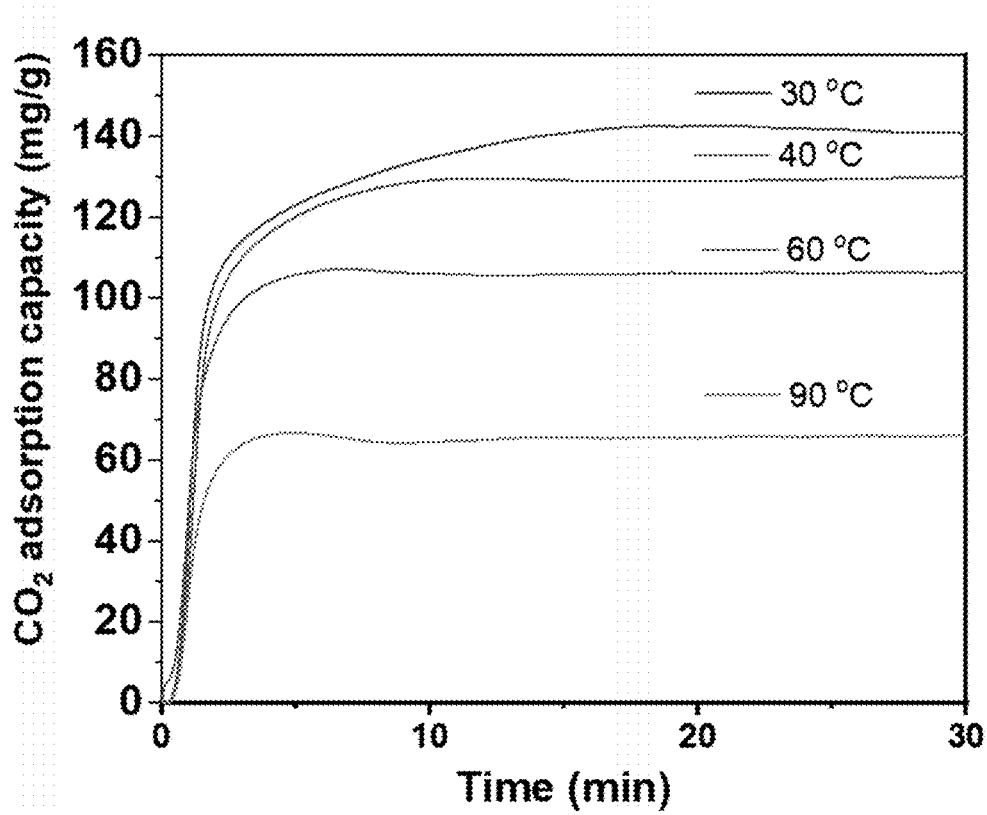
FIG. 6 is an absorption isotherm curve graph of an amine-functionalized adsorbent disclosed in Example 1 at 30° C., 40° C., 60° C., and 90° C.
Figure 7:
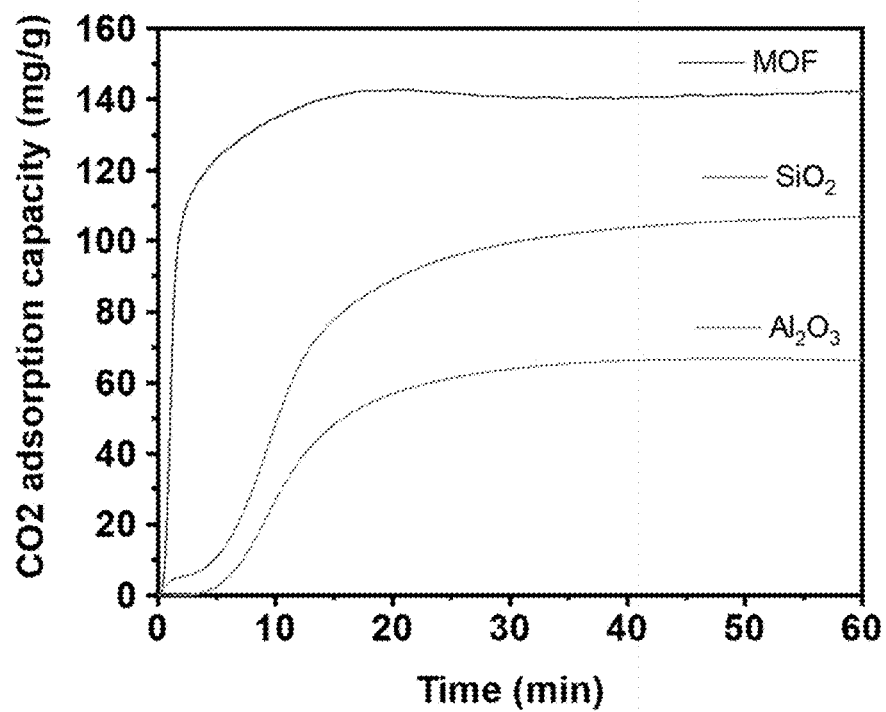
FIG. 7 is an absorption isotherm curve comparison graph of an amine-functionalized adsorbent disclosed in Example 1 and commercialized silicon dioxide as well as aluminum trioxide at normal temperature of 30° C.

4.1 Adsorption isothermal curves of the amine-functionalized adsorbent in example 1 at 30° C., 40° C., 60° C. and 90° C. were tested and plotted. The test results are seen in FIG. 6. FIG. 7 is an absorption isotherm curve comparison graph of an amine-functionalized adsorbent disclosed in example 1 and commercialized silicon dioxide as well as aluminum trioxide at a normal temperature of 30° C.

As can be seen FIG. 6, the reaction equilibrium of the amine-functionalized adsorbent in example 1 adsorbing carbon dioxide moves towards a desorption direction of carbon dioxide with increase in an adsorption test temperature, leading to reduction in the adsorption capacity of the amine-functionalized adsorbent on carbon dioxide. In other typical amine-functionalized adsorbents, the amine-functionalized adsorbents for loading the polymeric amine onto the surface of the support need heating for adsorption, because heating reduces the viscosity of the polymeric amine, the adhesion between adjacent amine-functionalized adsorbents decreases due to heating so as to reduce the dispersion resistance and realize better contact and adsorption with carbon dioxide, and the amine in the amine-functionalized adsorbent in example 1 here is in a high dispersion state, so the heating is not required to reduce the dispersion resistance. More importantly, the solid amine material of the MOF material substrate can reach adsorption equilibrium in a shorter time at a normal temperature, wherein the adsorption equilibrium can be reached within 15 min at 30° C., with an adsorption rate being much faster than that of the traditional commercial silicon-based and aluminum-based supports, which greatly expands the application prospects of the material.

As the adsorption test temperature increases, the reaction equilibrium of carbon dioxide adsorption moves towards the desorption direction of carbon dioxide, leading to decrease in the adsorption capacity of the amine-functionalized adsorbent on carbon dioxide. In other typical amine-functionalized adsorbents, the amine-functionalized adsorbents for loading the polymeric amine onto the surface of the support need heating for adsorption. Furthermore, the adsorption capacity increases with the increase of the temperature for the reason that the viscosity of the polymeric amine is reduced by heating, and the adhesion between adjacent amine-functionalized adsorbents is caused by heating so as to be less likely to agglomerate. The amine-functionalized adsorbent has an improved dispersion effect, and can better contact and adsorb with carbon dioxide. Therefore, heating can increase the adsorption capacity of carbon dioxide under the condition of small adsorption capacity at a normal temperature.

Correspondingly, in the present application, the polymeric amine is loaded inside the support so that the amine-functionalized adsorbent can fully contact and adsorb with carbon dioxide at a normal temperature. Therefore, the amine-functionalized adsorbent of the present application can obtain good adsorption capacity at a normal temperature. Furthermore, heating promotes the reaction equilibrium to move towards the desorption direction of carbon dioxide so as to reduce the adsorption capacity. Therefore, a change relationship between the adsorption capacity of carbon dioxide and the temperature is exactly opposite to the current situation of loading the polymeric amine onto the surface of the support.

4.2 90 cycles of adsorption was performed at 30° C., the adsorption isothermal curve at 30° C. was plotted, and the thermogravimetric isothermal curves of adsorption in an argon atmosphere and in a carbon dioxide atmosphere at 150° C. were plotted respectively. The test results are shown in FIG. 8.

Figure 8:
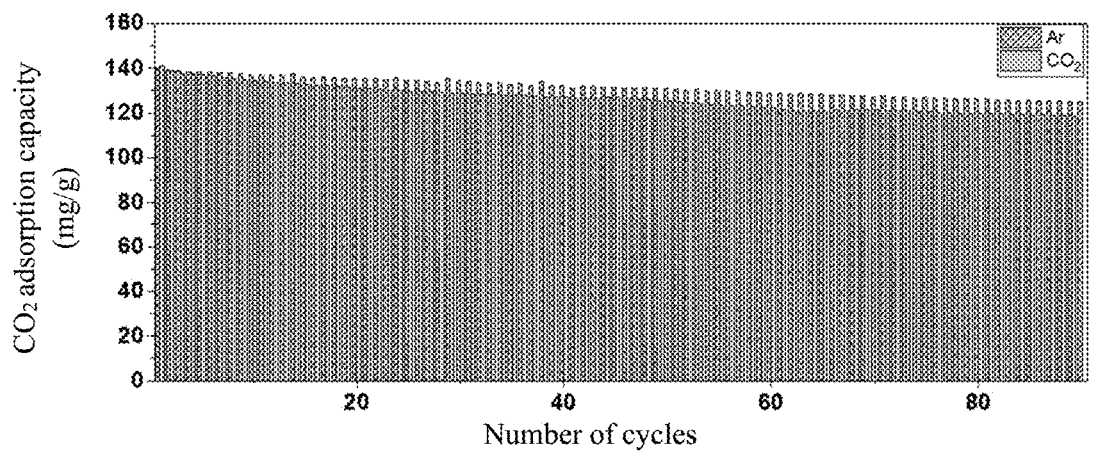
FIG. 8 is a thermogravimetric isothermal graph showing an amine-functionalized adsorbent disclosed in Example 1 conducts adsorption at 30° C. and desorption in an atmosphere of argon or carbon dioxide at 150° C.

As can be seen from FIG. 8, after 90 cycles at 30° C., the above-mentioned amine-functionalized adsorbent still maintains a high stability, with only 10.14% and 15.6% attenuation in desorption under argon and carbon dioxide, respectively, proving that the above-mentioned amine-functionalized adsorbent still maintains a high activity and carbon capture efficiency after multiple cycles.

4.3 The viscosities of amine-functionalized adsorbents in each example and each comparative example were tested and recorded, and the adsorption capacity when adsorbing for 20 min at 30° C. was tested. The test results are shown in Table 1.

TABLE 1

| | Viscosity (mPa · s) | Adsorption capacity (mg/g) |
|---|---|---|
| Example 1 | 246 | 141 |
| Example 2 | 476 | 139 |
| Example 3 | 496 | 137 |
| Example 4 | 209 | 136 |
| Example 5 | 703 | 132 |
| Example 6 | 108 | 83 |
| Example 7 | 2059 | 108 |
| Example 8 | 1080 | 114 |
| Example 9 | 2660 | 97 |
| Example 10 | 1340 | 110 |
| comparative example 1 | 3317 | 86 |

As can be seen from test results in Table 1, the adsorption capacity of the amine-functionalized adsorbent in example 1 is 63.95% higher than that in comparative example 1, and the viscosity in example 1 is reduced by 12.48 times compared with that in comparative example 1, proving that the MOF material and PEI are dispersed under the ultrasonic condition, which is beneficial for the entry of PEI into the MOF material and full dispersion inside the MOF material and then binding reaction with the acidic site inside the MOF material, however, the stirring state is not conducive to entry of PEI into the MOF material and full dispersion. The effect of the binding reaction between the MOF material and PEI is obviously reduced, leading to a higher viscosity and a lower adsorption capacity of the prepared amine-functionalized adsorbent at a normal temperature.

The adsorption capacity of the amine-functionalized adsorbent in example 1 is 30.56% higher than that in example 7, and the viscosity in example 7 is as 7.37 times as that in example 1; the adsorption capacity of the amine-functionalized adsorbent in example 1 is 23.68% higher than that in example 8, and the viscosity in example 8 is as 3.39 times as that in example 1; the adsorption capacity of the amine-functionalized adsorbent in example 1 is 45.36% higher than that in example 9, and the viscosity in example 9 is as 9.81 times as that in example 1; the adsorption capacity of the amine-functionalized adsorbent in example 1 is 28.18% higher than that in example 10, and the viscosity in example 10 is as 4.45 times as that in example 1, proving that PEI is fully dispersed and enters the interior of the cage-like pore structure of the MOF material only under the specific ultrasonic conditions and uniformly dispersed inside the cage-like pore structure of the MOF material. Therefore, the primary amine of the PEI can fully react with the acidic site inside the MOF material, and the obtained amine-functionalized adsorbent has a lower viscosity and a higher adsorption capacity. Too small ultrasonic power and frequency result in a fact that PEI difficultly achieves uniform dispersion and difficultly enters the interior of the cage-like pore structure of the MOF material. Too large ultrasonic power and frequency result in a fact that the cage-like pore structure of the MOF material is easily damaged, PEI cannot be loaded inside the cage-like pore structure of the MOF material, and the amine-functionalized adsorbent has a higher viscosity and a lower adsorption capacity.

The above description provides a detailed introduction to the amine-functionalized adsorbent and the method for preparing the same disclosed in the embodiments of the present invention. Specific examples are applied herein to explain the principles and implementation modes of the present invention. The explanations of the above embodiments are only used to help understand the amine-functionalized adsorbent and the method for preparing the same and its core idea of the present invention. At the same time, for those skilled in the art, changes should be made within specific embodiments and application ranges according to the ideas of the present invention. In conclusion, the content of the specification should not be understood as a limitation to the present invention.

What is claimed is:

1. A method for preparing an amine-functionalized adsorbent,
    wherein the amine-functionalized adsorbent comprises a metal-organic framework (MOF) material and polymeric amine, the crystal structure of the MOF material is a three-dimensional cage-like pore structure, and the polymeric amine is loaded inside the three-dimensional cage-like pore structure;
    the method comprising adding the MOF material and the polymeric amine into a second solvent, reacting through physical impregnation, and drying to obtain the amine-functionalized adsorbent;
    wherein the MOF material and the polymeric amine are mixed under the ultrasonic condition, the ultrasonic time is 10 min-60 min, the ultrasonic frequency is 10 KHz-60 KHz, and the ultrasonic power is 50 W-500 W;
    the viscosity of the amine-functionalized adsorbent is 100 mPa·s-1000 mPa·s;
    the relative molecular mass of the polymeric amine is 800-5000;
    the polymeric amine is a combination of polyethylene imine, or a combination of two different polyethyleneimines, or a combination of two different polypropylene amines, or a combination of polyethylene imine and polypropylene amine; and
    the reaction temperature is 30° C.-90° C.

2. The method for preparing the amine-functionalized adsorbent according to claim 1, wherein the interior of the three-dimensional cage-like pore structure contains an acidic site formed by an unsaturated metal site, the pore size of the three-dimensional cage-like pore structure is 1.5 nm-3.4 nm, and the polymeric amine binds with the MOF material through the acidic site.

3. The method for preparing the amine-functionalized adsorbent according to claim 1, wherein the specific surface area of the MOF material is 2000 m$^2$/g-3500 m$^2$/g, and the pore volume of the MOF material is 1.0 cm$^3$/g-1.5 cm$^3$/g.

4. The method for preparing the amine-functionalized adsorbent according to claim 1,
    wherein the MOF material is prepared by: dissolving a soluble metal salt, an organic ligand and a mineralizing agent into a first solvent, reacting for 6 h-48 h at 100° C.-240° C., and filtering after the end of the reaction to obtain the MOF material; and
    wherein a molar ratio of the soluble metal salt to the organic ligand is 1: (0.125-4), and the metal ion in the soluble metal salt is a combination of one or two of $Cr^{3+}$ and $Zn^{2+}$.

5. The method for preparing the amine-functionalized adsorbent according to claim 4,
    wherein the organic ligand is a combination of one or two of terephthalic acid and dimethylimidazole as well as derivatives thereof; and/or
    wherein the mineralizing agent is a combination of one or two of hydrofluoric acid and sodium acetate; and/or
    wherein the first solvent is a combination of one or more of deionized water, anhydrous methanol, and anhydrous ethanol.

6. The method for preparing the amine-functionalized adsorbent according to claim 1, wherein a mass ratio of the MOF material to the polymeric amine is 1: (0.33-15).

7. The method for preparing the amine-functionalized adsorbent according to claim 1, wherein the reaction time is 2 h-12 h.

8. The method for preparing the amine-functionalized adsorbent according to claim 1, wherein the second solvent is a water-soluble component which is a combination of one or more of a deionized aqueous solution, anhydrous methanol, and anhydrous ethanol.

9. The method for preparing the amine-functionalized adsorbent according to claim 1, wherein before the MOF material is mixed with the polymeric amine, the MOF material is activated in an oxygen-free environment at 100° C.-150° C., and the oxygen-free environment is achieved by vacuumizing, charging $N_2$ or discharging air with an inert gas.

10. The method for preparing the amine-functionalized adsorbent according to claim 1, wherein the drying conditions are as follows: drying for 3 h-4 h at 30° C.-80° C., or ventilating for 1 h-4 h before drying and then drying for 3 h-4 h at 30° C.-80° C.

* * * * *